United States Patent [19]
Reed et al.

[11] Patent Number: 5,926,761
[45] Date of Patent: *Jul. 20, 1999

[54] METHOD AND APPARATUS FOR MITIGATING THE EFFECTS OF INTERFERENCE IN A WIRELESS COMMUNICATION SYSTEM

[75] Inventors: John Douglas Reed, Arlington; Walter Joseph Rozanki, Jr., Hurst, both of Tex.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/664,216

[22] Filed: Jun. 11, 1996

[51] Int. Cl.⁶ ............................................. H04B 7/26
[52] U.S. Cl. ........................... 455/440; 455/456; 455/63; 455/67.3
[58] Field of Search .......................... 455/33.2, 63, 67.3, 455/308, 33.1, 34.1, 54.1, 54.2, 62, 67.1, 67.6, 89, 456, 457, 440, 478, 449, 450, 454, 455, 509, 550, 575, FOR 121, 439, 525, 443

[56] References Cited

U.S. PATENT DOCUMENTS

| | | | |
|---|---|---|---|
| 4,739,518 | 4/1988 | Bickley et al. | 455/308 |
| 5,048,015 | 9/1991 | Zilberfarb . | |
| 5,148,548 | 9/1992 | Meche et al. | 455/63 |
| 5,214,789 | 5/1993 | George | 455/33.2 |
| 5,235,633 | 8/1993 | Dennison et al. | 455/440 |
| 5,258,997 | 11/1993 | Fraser et al. . | |
| 5,390,339 | 2/1995 | Bruckert et al. | 455/440 |
| 5,396,647 | 3/1995 | Thompson et al. | 455/440 |
| 5,442,805 | 8/1995 | Sagers et al. | 455/89 |
| 5,448,750 | 9/1995 | Eriksson et al. | 455/34.1 |
| 5,448,754 | 9/1995 | Ho et al. | 455/63 |
| 5,475,866 | 12/1995 | Ruthenberg | 455/63 |
| 5,497,503 | 3/1996 | Rydberg et al. | 455/63 |
| 5,508,708 | 4/1996 | Ghosh et al. . | |
| 5,511,233 | 4/1996 | Otten | 455/63 |
| 5,548,800 | 8/1996 | Olds et al. | 455/54.1 |
| 5,594,947 | 1/1997 | Grube et al. | 455/63 |

*Primary Examiner*—Reinhard J. Eisenzopf
*Assistant Examiner*—Lester G. Kincaid
*Attorney, Agent, or Firm*—Richard A. Sonnentag; Sayed Hossain Beladi

[57] ABSTRACT

A wireless communication system (200) estimates (303) the location of a mobile station (215) when a degradation in the mobile station's communication occurs due to interference, and stores (305) the location estimate in a database. The database is used to determine the potential for the mobile station (215) within the wireless communication system to receive interference based on its estimated location or its proximity to the known interference location. When the mobile station (215) is within a predetermined distance of the known interference location, the likelihood for the mobile station (215) to experience a degradation in call quality, duration, etc. increases. To mitigate the degradation due to interference, an alternate carrier (104) is found and if available, the mobile station's communication is handed off to the alternate carrier (104). Attenuation can also be added in the front-end of the mobile station (215) to mitigate the degradation due to interference.

7 Claims, 4 Drawing Sheets

-PRIOR ART- 5,926,761

METHOD AND APPARATUS FOR MITIGATING THE EFFECTS OF INTERFERENCE IN A WIRELESS COMMUNICATION SYSTEM

RELATED APPLICATION

Reference is made to U.S. patent application Ser. No. (Docket No. CE03008R), "Method and Apparatus for Controlling a Wireless Communication System" on behalf of Labedz et al., filed Apr. 26, 1996 and assigned to the assignee of the present invention.

FIELD OF THE INVENTION

The present invention relates generally to wireless communication systems and, more particularly, to interference avoidance in such wireless communication systems.

BACKGROUND OF THE INVENTION

Specific techniques to avoid interference in wireless communication systems are known in the art. For example, U.S. Pat. No. 5,048,015 discloses the use of an identification code which is transmitted within signals to identify the presence and source of identification. U.S. Pat. No. 5,148,548 prioritizes channels for use based on their likelihood that they would cause interference if used. U.S. Pat. No. 5,258,997 uses modulation techniques in a spread spectrum system to avoid interfering with narrowband systems. U.S. Pat. No. 5,255,514 avoids selecting channels which may interfere with calls in neighboring cells or which may suffer substantial interference from a neighboring base-station.

The current Code Division Multiple Access (CDMA) wireless communication system envisioned for, inter alia, cellular applications in the United States is defined by TIA/EIA/IS-95, *Mobile Station-Base Station Compatibility Standard for Dual Mode Wideband Spread Spectrum Cellular System*, July 1993. To implement CDMA, many system operators are clearing out a block of frequencies and placing CDMA carriers within the block. These CDMA carriers are typically placed next to the narrowband channels already installed in a system, as shown in FIG. 1.

Referring to FIG. 1, the typical channelization plan where two narrowband carriers 100, 101 are adjacent to two wideband (CDMA) carriers 103, 104 is shown. As is clear from FIG. 1, the CDMA carriers 103, 104 are much wider than the narrowband carriers 100, 101. Additionally, the guard band 105 between the CDMA carrier 103 and the narrowband carrier 101 is insufficient to protect a CDMA mobile station communicating on the CDMA carrier 103 from interference due to the narrowband carrier 101 when the CDMA mobile station is close to a base-station (not shown) which transmits the narrowband carrier 101. This is due to the practical limitation in the design of a wideband receiver implemented in a CDMA mobile station and its inability to sufficiently reject the adjacent narrowband carrier. Because of this, degradation of the communication (the call) occurs when the CDMA mobile station is within a certain distance of the interfering narrowband base-station. In addition to the effect of single adjacent narrow band carriers, combinations of carriers can produce degradation due to other mechanisms including intermodulation.

Thus, a need exists for an improved wireless communication system which overcomes the shortcomings mentioned above.

DETAILED DESCRIPTION OF A PREFERRED EMBODIMENT

A wireless communication system estimates a mobile station's location when a degradation in the mobile station's communication occurs due to interference, and records the location estimate in a database. After sufficient training, the database is used to determine the potential for mobile stations within the wireless communication system to receive interference based on their estimated location or their proximity to the known interference location. To mitigate the degradation due to interference, alternate carriers are checked for their capability to offer improved performance. If an alternate carrier is found and available, the mobile station's communication is handed off to the alternate carrier before interference degradation in the mobile station's communication occurs.

Generally stated, a wireless communication system, which is responsive to a mobile station via a communication resource, mitigates the effects of interference by first tracking a characteristic of the mobile station to produce a tracked characteristic. The wireless communication system then compares the tracked characteristic with an interference characteristic related to a potential source of interference. Based on the comparison, the wireless communication system takes the necessary steps to appropriately mitigate the effects of the potential source of interference.

In the preferred embodiment, the tracked characteristic is the location of the mobile station which produces a mobile station location estimate. Also in the preferred embodiment, the interference characteristic is a location of the potential source of interference. When the mobile station location estimate is within a predetermined distance of the location of the potential source of interference, the communication of the mobile station is handed off to avoid the potential source of interference. The predetermined distance of the location of the potential source of interference varies due to several factors, including expected or measured propagation losses and the configuration of the wireless communication system.

Figure 2:
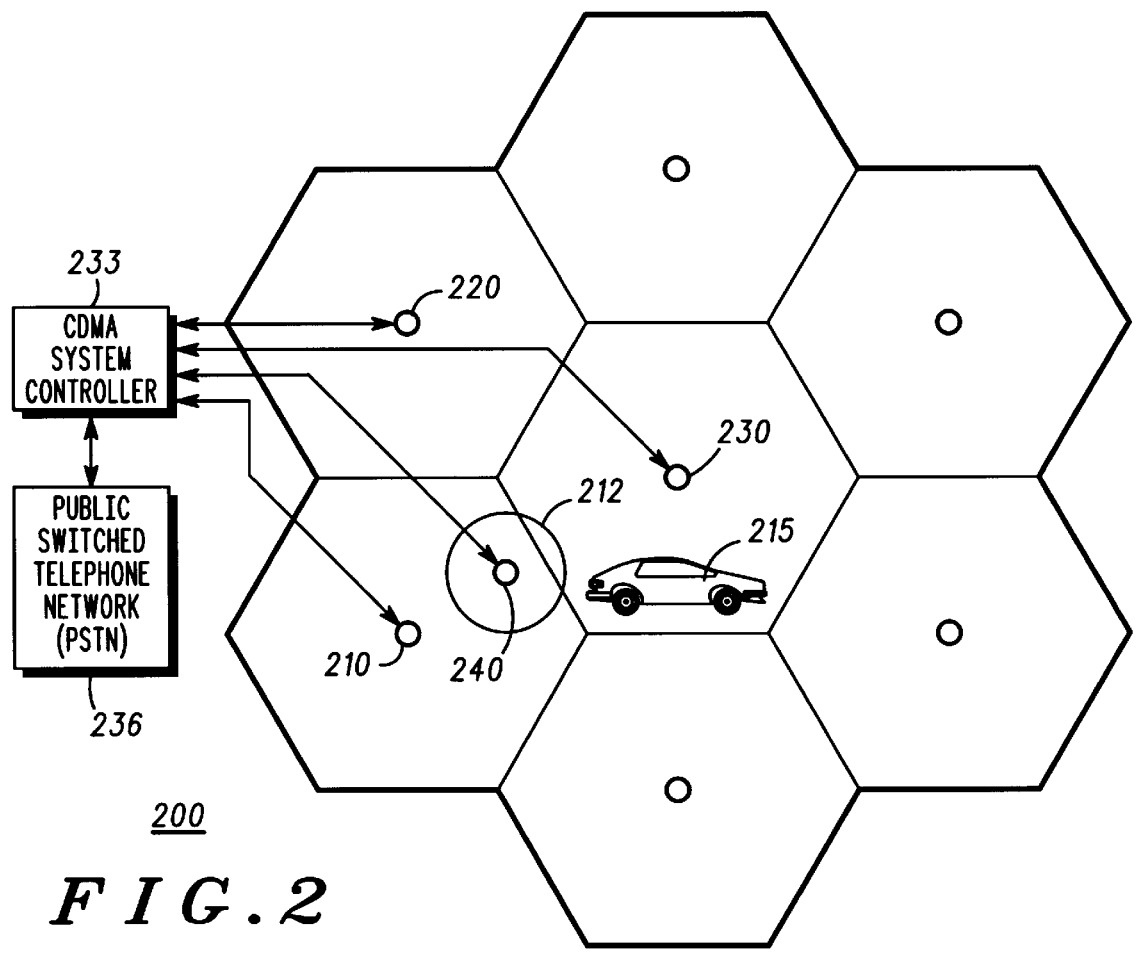
FIG. 2 generally depicts a wireless communication system which may beneficially implement interference mitigation in accordance with the invention.

FIG. 2 generally depicts the preferred embodiment of interference avoidance in accordance with the invention. In this embodiment, a global positioning system (GPS) receiver located in the CDMA mobile station 215 is implemented. The GPS receiver in the CDMA mobile station 215 monitors location information transmitted by GPS satellites, and reports it's location to one or all of the CDMA base-stations 210, 220, 230. GPS, however, has limited effectiveness in buildings, underground parking structures, etc. To overcome the limitations of GPS, a location method as disclosed in U.S. Pat. No. 5,508,708 to Ghosh et al., assigned to the assignee of the present application, and incorporated herein by reference, can likewise be employed. As one skilled in the art will appreciate, a combination of the two well known techniques could be employed in still another embodiment. Still other methods of location estimation can be beneficially implemented without departing from the spirit and scope of the invention.

Referring to FIG. 2, CDMA base-stations 210, 220, 230 are coupled to a CDMA system controller 233, which is itself coupled to the public switched telephone network (PSTN) 236. A potential source of interference, such as a narrowband base-station 240, has its area of potential interference defined by the region 212. When the location of the CDMA mobile station 215 is estimated to be within the region 212, there is a high likelihood that the CDMA mobile station 215 will suffer interference due to the narrow-band base-station 240.

For exemplary purposes only, it is assumed that the CDMA mobile station 215 is capable of communicating on the CDMA carrier 103 (the first communication resource) and the potential source of interference is the narrowband base-station 240 which transmits the narrowband carrier 101. As is well known in the art, the CDMA system controller 233 is capable of tracking a characteristic of the mobile station, which in this embodiment is the mobile station's location. For further details on tracking a characteristic of the mobile station, see the U.S. Pat. No. 5,508,708 to Ghosh et al. referenced above.

Figure 1:
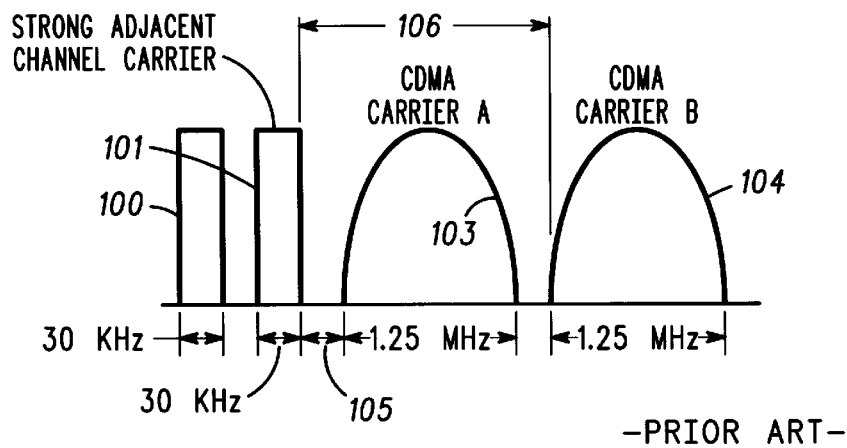
FIG. 1 generally depicts a typical (prior art) channelization plan where narrowband carriers are adjacent to wideband (CDMA) carriers.

Referring to FIG. 1 and FIG. 2, the region 212 essentially defines a "region of interference". In other words, if the mobile station 215 ventures into the region 212, the mobile station's communication on the CDMA carrier 103 is likely to be degraded by the nearby narrowband carrier 101 (i.e., the source of the interference). Degradation can also be produced by multiple narrow band carriers. The location within the region 212 is thus an interference characteristic which defines the potential source of the interference. When the CDMA system controller 233 detects that the mobile station 215 is within the region 212 (i.e., the mobile station's location estimate is within a predetermined distance of the potential source of interference), the CDMA system controller 233 takes the necessary steps to appropriately avoid the potential source of interference. In the preferred embodiment, the CDMA system controller hands off the mobile station's communication from the CDMA carrier 103 to the CDMA carrier 104 (the second communication resource). Since sufficient guard band 106 now exists between the two carriers 101, 104 after handoff, any interference that might have been caused by the proximity of the narrowband carrier 101 with respect to the CDMA carrier 103 is avoided in accordance with the invention.

While the process of handing off the mobile station's communication to from one CDMA carrier to another to avoid the interference has been described as one embodiment, other beneficial steps can likewise be implemented. For example, based on the comparison of the tracked characteristic with an interference characteristic related to the potential source of interference, an attenuator at the front-end of the mobile station 215 can be enabled to mitigate the effects of the interference as is well known in the art. In this manner, the interference is not avoided in its entirety, but is instead attenuated from an unacceptable level to a level which is acceptable to produce adequate call quality to an end user.

Figure 3:
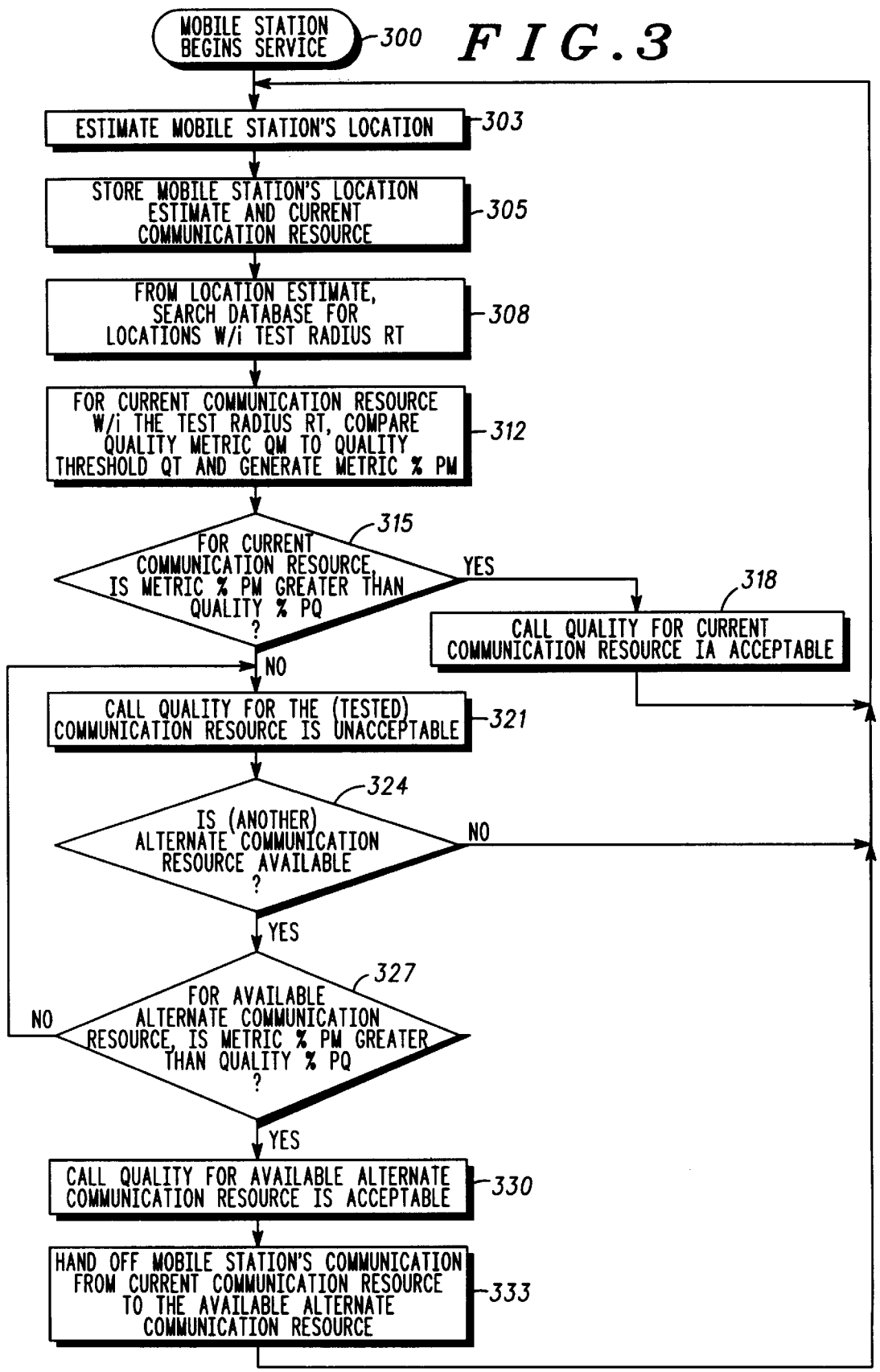
FIG. 3 generally depicts, in flow diagram form, the use of call quality to mitigate interference in accordance with the invention.

FIG. 3 generally depicts, in flow diagram form, the use of call quality to avoid interference in accordance with the invention. The process starts at step 300 when the mobile station 215 begins service. At step 303, the location of the mobile station 215 is estimated (using GPS or one of the other methods described above). The mobile station's location estimate and current communication resource are then stored, at step 305, into a database local to the CDMA system controller 233. Again, the current communication resource being used by the mobile station 215 is readily available from the particular base-station 210, 220 or 230 servicing the mobile station 215 and is known by the CDMA System Controller 233. After the location estimate and the current communication resource are stored into the database, the database is searched at step 308 for locations within a test radius Rt. In the preferred embodiment, the test radius Rt is the radius which defines the region 212. Continuing, a quality metric Qm for the current communication resource (i.e., the communication resource serving the mobile station 215) within the test radius Rt is then compared at step 312 with a quality threshold Qt and a metric percentage Pm is generated.

At this point, a test is performed at step 315 to determine if the quality percentage Pq is greater than a predetermined quality percentage Pq. In the preferred embodiment, the quality percentage Pq is a function of frame erasure rate (FER) and the mobile station's location estimate, and thus varies as the mobile station 215 moves. Continuing, if the test 315 is positive, the call quality for the current communication resource within the test radius Rt is acceptable, step 318, and the process returns to step 303. If, however, the test 315 is negative, the call quality for the current communication resource within the test radius Rt is unacceptable, step 321, and the process flows to the test at step 324.

At step 324, a test is performed to determine if an alternate communication resource is available. If no alternate is available, the process returns to step 303. If an alternate is available, the process flows to step 327 where the test at step 315 is repeated, but this time for the available alternate communication resource. If the test at step 327 is negative, the call quality for the available alternate communication resource is unacceptable (step 318), and the test at step 324 is repeated to determine whether another alternate communication resource is available. If the test at step 327 is positive, then the call quality for the alternate communication resource is acceptable at step 330, and the communication of the mobile station 215 is handed off from the current communication resource to the available communication resource at step 333. After the hand off at step 333, the process returns to step 303. In this manner, interference is avoided in accordance with the invention.

Figure 4:
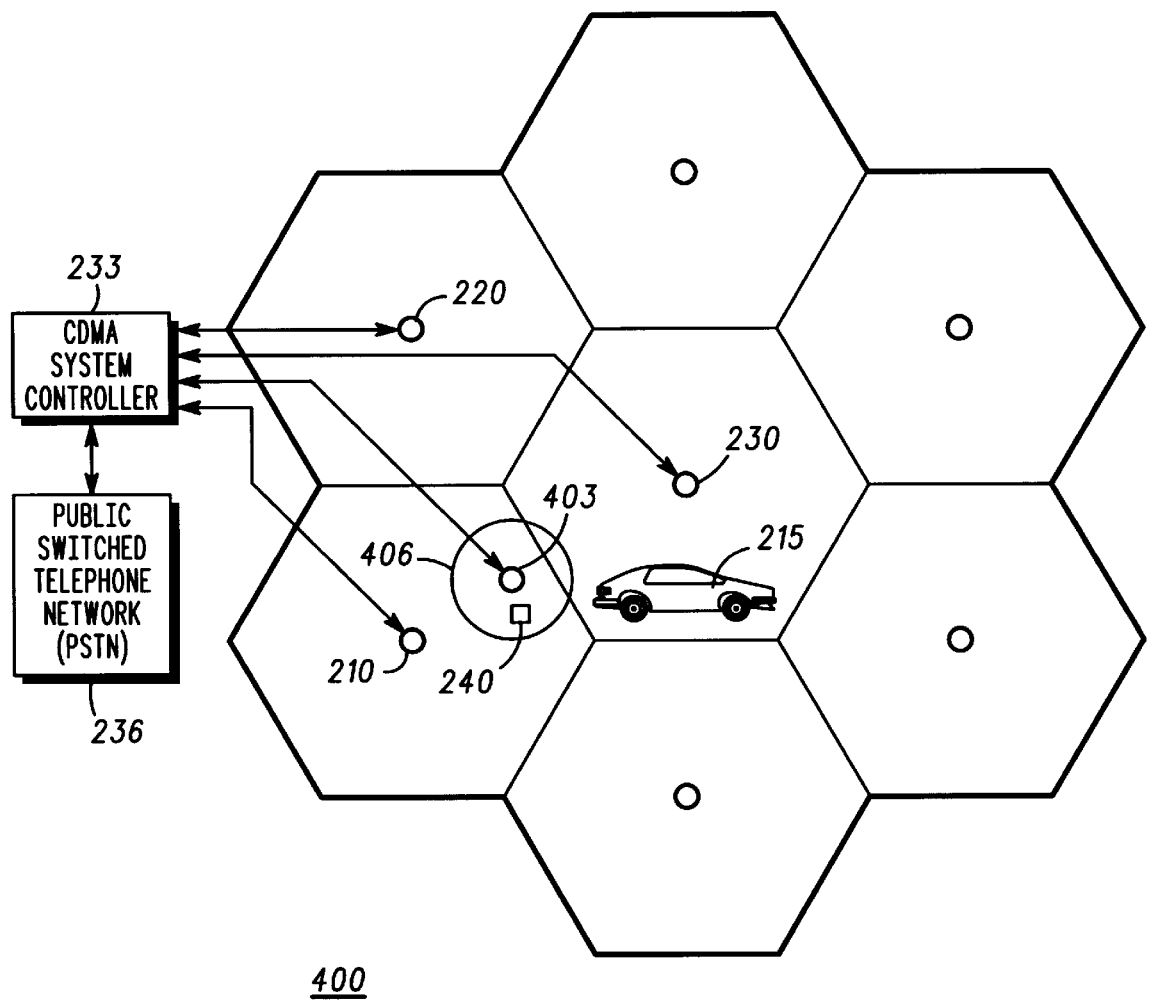
FIG. 4 generally depicts an alternate embodiment wireless communication system which may beneficially implement interference mitigation in accordance with the invention.

FIG. 4 generally depicts an alternate embodiment wireless communication system 400 which may beneficially implement interference avoidance in accordance with the invention. In this embodiment, the location information of the mobile station is obtained at specific, pre-defined locations by the use of proximity detectors. As is well known in the art, proximity detectors can either be a small auxiliary transmitter which a mobile station is capable of detecting or a small auxiliary receiver which can detect a mobile station's transmission. Dependent on the effective range of the proximity detectors, multiple proximity detectors could be used in combination to identify the location of a potential interference (e.g. one on each side of the highway leading to the interference). By placing these small transmitters or receivers near potential sources of interference, a system controller can detect when a mobile station is near these "potential interference" locations, and can thus perform the necessary steps to mitigate the effects of interference in accordance with the invention.

Referring to FIG. 4, many elements of FIG. 4 are common with corresponding elements in FIG. 2, thus like elements have like designation. Additionally shown in FIG. 4 is a proximity detector 403 (in the form of a receiver) coupled to the CDMA system controller 233. The area defined by the proximity detector 403 is the region 406; stated differently, the proximity detector 403 can receive a communication of a mobile station 215 when the mobile station 215 is within the region 406.

The location of the proximity detector 403 is not arbitrary, but is strategically located next to a potential source of interference, such as the narrowband base-station 240. For exemplary purposes only, it is assumed that the mobile station 215 is capable of communicating on the CDMA carrier 103 (the first communication resource) and the potential source of interference is the narrowband base-station 240 which transmits the narrowband carrier 101.

Figure 5:
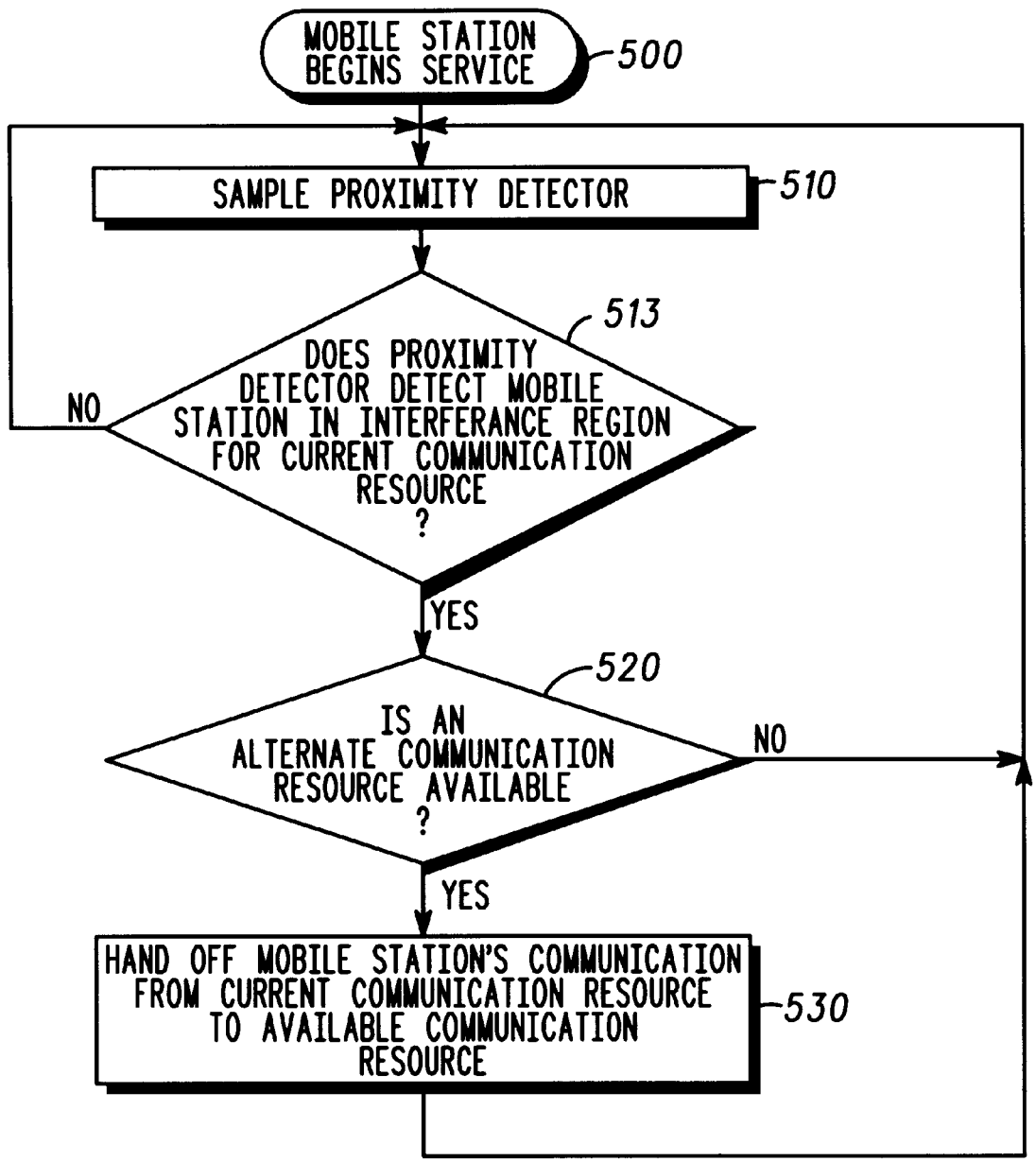
FIG. 5 generally depicts, in flow diagram form, interference mitigation in a wireless communication system in accordance with the invention.

FIG. 5 generally depicts, in flow diagram form, interference avoidance using a proximity detector 403 in accordance with the invention. In this method, alternate channels are reserved for use in the region 406. The process starts at step 500 when the mobile station 215 begins service. The proximity detector 403 is then sampled at step 510. A test 513 is then performed to determine whether the proximity detector 403 detected the mobile station 215 in the "interference" region 406 associated with the current communication resource (for example, the CDMA carrier 103 associated with the narrowband carrier 101). If the result of the test 513 is negative, the process returns to step 510. If the result of the test 513 is positive (by the mobile station's transmission level being received by the proximity detector 211 above a predetermined threshold), then the mobile station 215 is likely to experience an interference which would degrade its communication.

To avoid the interference, the CDMA system controller 233 performs a test at step 520 to determine the availability of an alternate communication resource. For the particular embodiment described, a valid alternative communication resource would be the CDMA carrier 104. It should be noted that the CDMA carrier 104 is a valid alternative communication resource because of the sufficient guard band 106 between it and the interfering narrowband carrier 101; in other embodiments, different criterion may be applied to determine the validity of alternative communication resources. Additionally, an attenuator could be applied to reduce the effect of the interference caused by strong narrow band carriers. Continuing, if the test 520 is negative, then a handoff can not occur and the process returns to step 510. If the test 520 is positive, the CDMA system controller 233 initiates a handoff at step 530 of the mobile station's communication from the current communication resource to the available alternate communication resource, and return the process to step 510. In this manner, interference is avoided in accordance with the invention.

Important to note is that the test recited in step 513 is but one criterion that can be used to avoid interference in accordance with the invention. An example of another criterion which could be used is to determine whether the mobile station 215 is experiencing a degraded call quality, either in the uplink or the downlink direction. This could be done by defining a quality metric (Qm) such as frame erasure rate (FER), a measured received signal strength indications (RSSIs) or any similar metric which generally gives a measure of signal level to interference/noise level. In fact, any metric that gives an indication of call quality is contemplated for use in accordance with the invention.

Accordingly, it is intended that the invention not be limited by the foregoing description of embodiments, but to embrace all such alterations, modifications, and variations in accordance with the spirit and scope of the appended claims. While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What we claim is:

1. A method of mitigating the effects of interference in a wireless communication system that includes a plurality of mobile stations, at least one of the plurality of mobile stations responsive to the wireless communication system via a communication resource, the method comprising the steps of:

determining a location of at least one of the plurality of mobile stations while experiencing at least an effect of occurrence of interference in the communication system, and storing said determined interference location in a data base;

tracking a location of the at least one of the plurality of mobile station responsive to the wireless communication system to produce a tracked characteristic;

comparing the tracked characteristic with said determined interference location stored in said data base; and handing off the at least one of the plurality of mobile station responsive to the wireless communication system from a first communication resource to a second communication resource to mitigate at least an effect of potential occurrence of interference based on the comparison.

2. The method of claim 1 wherein the step of tracking a location of the mobile station to produce a tracked characteristic further comprises the step of tracking the location of the mobile station to produce a mobile station location estimate either using GPS or proximity detectors.

3. The method of claim 1 wherein the step of handing off the mobile station to mitigate at least the effect of the potential occurrence of interference further comprises handing off the mobile station from the first communication resource to the second communication resource based on call quality information.

4. The method of claim 2, wherein the step of handing off the at least one of the plurality of mobile station responsive to the wireless communication system further comprises the step of handing off the mobile station when the mobile station's location estimate is within a predetermined distance of said determined interference location stored in said data base.

5. The method of claim 4, wherein the predetermined distance varies based on expected or measured propagation losses.

6. The method of claim 4, wherein the predetermined distance varies based on a configuration of the wireless communication system.

7. An apparatus for mitigating the effects of interference in a wireless communication system that includes a plurality of mobile stations, at least one of the plurality of mobile stations responsive in the wireless communication system via a communication resource, the apparatus comprising:

means for determining a location of at least one of the plurality of mobile stations while experiencing at least an effect of occurrence of interference in the communication system, and means for storing said determined interference location in a data base;

means for tracking a location of the at least one of the plurality of mobile station responsive to the wireless communication system to produce a tracked characteristic;

means for comparing the tracked characteristic with said determined interference location stored in said data base; and means for initiating a handoff of the mobile station responsive to the wireless communication system from a first communication resource to a second communication resource to mitigate at least an effect of potential occurrence of interference based on the comparison.

* * * * *

UNITED STATES PATENT AND TRADEMARK OFFICE
CERTIFICATE OF CORRECTION

PATENT NO. : 5,926,761

DATED : July 20, 1999

INVENTOR(S) : John Douglas Reed; Walter Joseph Rozanki, Jr.

It is certified that error appears in the above-identified patent and that said Letters Patent is hereby corrected as shown below:

Column 6, Line 66 delete "in" and insert --to--

Signed and Sealed this

Seventh Day of March, 2000

Attest:

Attesting Officer

Q. TODD DICKINSON

*Commissioner of Patents and Trademarks*

UNITED STATES PATENT AND TRADEMARK OFFICE
CERTIFICATE OF CORRECTION

PATENT NO. : 5,926,761
DATED : July 20,1999
INVENTOR(S) : John Douglas Reed; Walter Joseph Rozanki, Jr.

It is certified that error appears in the above-identified patent and that said Letters Patent is hereby corrected as shown below:

Column 6,Line 66 delete "in" and insert --to--
Second inventor's name "walter Joseph Rozanki, Jr." is misspelled. Please delete "Rozanki" and insert --Rozanski--

Signed and Sealed this

Sixteenth Day of May, 2000

Attest:

Q. TODD DICKINSON

Attesting Officer

Director of Patents and Trademarks